United States Patent
Englund et al.

(10) Patent No.: US 9,133,320 B2
(45) Date of Patent: *Sep. 15, 2015

(54) POLYOLEFIN COMPOSITION FOR MEDIUM/HIGH/EXTRA HIGH VOLTAGE CABLES COMPRISING BENZIL-TYPE VOLTAGE STABILISER

(75) Inventors: Villgot Englund, Gothenburg (SE);
Thomas Hjertberg, Kungshamn (SE);
Mats Andersson, Alafors (SE)

(73) Assignee: BOREALIS AG, Vienna (AT)

( * ) Notice: Subject to any disclaimer, the term of this patent is extended or adjusted under 35 U.S.C. 154(b) by 308 days.

This patent is subject to a terminal disclaimer.

(21) Appl. No.: 13/583,081

(22) PCT Filed: Feb. 16, 2011

(86) PCT No.: PCT/EP2011/000730
§ 371 (c)(1),
(2), (4) Date: Oct. 16, 2012

(87) PCT Pub. No.: WO2011/110280
PCT Pub. Date: Sep. 15, 2011

(65) Prior Publication Data
US 2013/0025910 A1    Jan. 31, 2013

(30) Foreign Application Priority Data
Mar. 18, 2010 (EP) .................................... 10002372

(51) Int. Cl.
*C08K 5/07* (2006.01)
*H01B 3/44* (2006.01)

(52) U.S. Cl.
CPC . *C08K 5/07* (2013.01); *H01B 3/441* (2013.01)

(58) Field of Classification Search
CPC ......... C08L 23/00; C08L 23/025; C08K 3/28; C08K 5/005; C08K 5/03; C08K 5/15; C08K 5/132
USPC .................... 524/89, 186, 367; 174/102, 110
See application file for complete search history.

(56) References Cited

U.S. PATENT DOCUMENTS

| | | | |
|---|---|---|---|
| 3,482,033 A | 12/1969 | Kenney et al. | |
| 8,519,037 B2 * | 8/2013 | Hjertberg et al. | 524/186 |
| 8,765,843 B2 * | 7/2014 | Hjertberg et al. | 523/351 |
| 2010/0263903 A1 * | 10/2010 | Hjertberg et al. | 174/102 SC |

FOREIGN PATENT DOCUMENTS

| | | |
|---|---|---|
| EP | 0 206 894 | 12/1986 |
| WO | WO 93/08222 | 4/1993 |
| WO | WO 01/08166 | 2/2001 |
| WO | WO 2008/014597 | 2/2008 |

OTHER PUBLICATIONS

International Search Report mailed May 10, 2011 for International application No. PCT/EP2011/000730.
Written Opinion mailed May 10, 2011 for International application No. PCT/EP2011/000730.
Ashcraft, A.C. et al., *Laboratory Studies of Treeing in Solid Dielectrics and Voltage Stabilization of Polyethylene*, pp. 213-218, presented as I.E.E.E. International Symposium on Electrical Insulation, Montreal, Canada, 1978.

* cited by examiner

*Primary Examiner* — Hannah Pak
(74) *Attorney, Agent, or Firm* — Fay Sharpe LLP

(57) ABSTRACT

Disclosed is a polyolefin composition comprising (i) a polyolefin (A), (ii) a benzil derivative (B) comprising the structural unit according to the following formula (I), wherein one or more of the carbon atoms in the phenyl rings to which residue R1, R2, R3, R4, R5, R6, R7, R8, R9 or R10 is attached may also be a heteroatom; R1, R2, R3, R4, R5, R6, R7, R8, R9 and R10 independently are hydrogen, or a hydrocarbyl group which may contain heteroatoms; or at least two of said R1, R2, R3, R4, R5, R6, R7, R8, R9 and R10 form a further aromatic or non-aromatic ring and such system has one to eight substituents, R1' to R8', and n=2 to 9; with the proviso that at least one hydrocarbyl group is present.

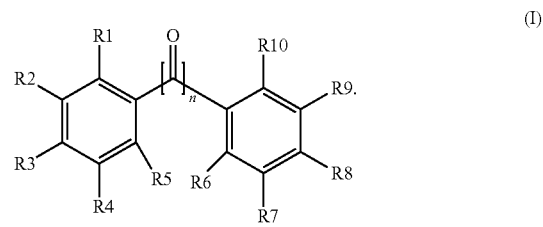

26 Claims, No Drawings

POLYOLEFIN COMPOSITION FOR MEDIUM/HIGH/EXTRA HIGH VOLTAGE CABLES COMPRISING BENZIL-TYPE VOLTAGE STABILISER

The present invention relates to a polyolefin composition with improved electrical breakdown strength, to a wire or cable, in particular a medium, high or extra high voltage cable, comprising such a composition, and to the use of such a composition for the production of a wire or cable, in particular a medium, high or extra high voltage cable.

A typical medium voltage power cable, usually used for voltages from 6 to 36 kV, a typical high voltage cable used for voltages higher than 36 kV, and a typical extra high voltage cable used for voltages higher than 220 kV, comprises one or more conductors in a cable core that is surrounded by several layers of polymeric materials, including an inner semiconducting layer, followed by an insulating layer, and then an outer semiconducting layer. These layers are normally cross-linked. To these layers, further layers may be added, such as a metallic tape or wire shield, screens, and, finally, outermost jacketing layer(s). The layers of the cable are based on different types of polymer compositions. As insulating materials, today cross-linked polyolefins like cross-linked low density polyethylene are predominantly used.

It is a constant aim of cable manufacturers to increase the electrical breakdown strength of cable materials, in particular cable insulation materials, in order to achieve greater reliability or to develop new cable constructions where the insulation is subjected to higher stress. Defects in the insulation set a limit on the minimum insulation thickness and thereby maximum electrical design stress applied to the cable. To secure high reliability on high stress cable constructions it is known to reduce the amount of contaminants in the insulation material. However, nowadays already super clean materials are used for insulation, and improvements in electrical breakdown strength by further reduction of contaminants are associated with a significant increase in cost.

It is furthermore known to use active additives, namely so called voltage stabilisers, in order to increase the electrical breakdown strength of cable insulation materials. For example, in U.S. Pat. No. 3,482,033 it is disclosed to use a blend of non-volatile hydrocarbon oil of high aromatic content or a highly aromatic, low melting hydrocarbon together with active voltage stabilisers such as polyhalopolyphenyls or nitro-group containing aromatics.

Furthermore, voltage stabilisers are known from WO 01/08166. In this document, voltage stabilisers based on benzophenone as core molecule substituted with alkyl, aryl, alkoxy and aryloxy groups are disclosed.

However, there is still the need for voltage stabilisers which improve the electrical breakdown strength of polyolefin compositions used for medium/high/extra high voltage cable isolation. Such voltage stabiliser compounds should usually have a low ionisation potential to decrease the energy of high energy electrons and hence increase the electrical breakdown strength efficiently (see e.g. A. C. Ashcraft, R. M. Eichhorn, and S. R. G., "Laboratory Studies of Treeing in Solid Dielectrics and Voltage Stabilization of Polyethylene" presented as I.E.E.E. International Symposium on Electrical Insulation, Montreal, Canada, 1978).

At the same time, the compounds must be soluble in the polyolefin, usually cross-linked polyethylene, used as a matrix polymer in the composition, and, furthermore, must show low migration tendency, so that the loss of the compound in the insulation material with time is as low as possible.

Still further, as usually insulating compositions are cross-linked polyolefins, the voltage stabiliser must as far as possible be compatible to commonly used cross-linking agents, such as organic peroxides, so that, on the one hand, the cross-linking process is not negatively affected, and, on the other hand, the voltage stabiliser is not reacting or decomposing which would reduce its efficiency or even, in the worst case, render it inactive. Of course, the voltage stabiliser should also be compatible in this sense with regard to all other components of the polyolefin composition.

It is thus an object, to provide a polyolefin composition comprising a voltage stabiliser for improving the electrical breakdown strength of a polyolefin composition, especially for the use as an insulating composition in a medium/high/extra high voltage cable, which has the above-mentioned properties. In particular the voltage stabiliser provides a significant improvement in electrical breakdown, has preferably also a good solubility in the polyolefin matrix and a low migration tendency, and more preferably is compatible with regard to other components of the polyolefin composition, in particular to cross-linking agents.

It has now surprisingly been found that the above objects can be achieved by a polyolefin composition, a masterbatch both comprising a benzil derivative as well as the use of said benzil derivative, which comprises one or more substituents at the phenyl groups of the benzil molecule comprising a hydrocarbyl group, as a voltage stabiliser compound.

The present invention therefore provides a polyolefin composition comprising (i) a polyolefin (A), (ii) a benzil derivative (B) comprising the, preferably consisting of the, structural unit according to the following formula (I):

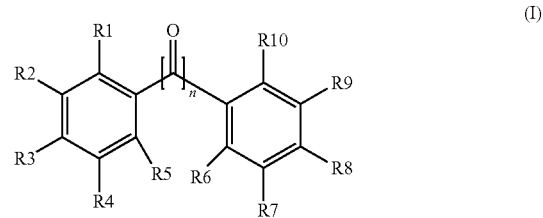

wherein one or more of the carbon atoms in the phenyl rings to which residue R1, R2, R3, R4, R5, R6, R7, R8, R9 or R10 is attached may also be a heteroatom, such as N, in which case the respective residue R1, R2, R3, R4, R5, R6, R7, R8, R9 or R10 is not present;

R1, R2, R3, R4, R5, R6, R7, R8, R9 and R10 independently are hydrogen, or a hydrocarbyl group which may contain heteroatoms;

or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R10; and n=2 to 9;
with the proviso that
(i) at least one of said R1, R2, R3, R4, R5, R6, R7, R8, R9 or R10, or if present, at least one of said R1' to R8', is a hydrocarbyl group which may contain one or more heteroatoms.

The term "hydrocarbyl group" denotes any substituent which is composed of carbon and hydrogen atoms regardless of the degree of saturation, e.g. alkyl groups, alkenyl groups, alkinyl groups and aromatic groups composed of C and H. Where it is indicated that a hydrocarbyl group may contain heteroatoms these are atoms different from C and H, such as Si, N, P, O or S, typically N or O.

It has been found that the use of the above compounds as voltage stabiliser yields insulating polyolefin compositions with significantly improved electrical breakdown strength. The improvement in electrical breakdown strength can be seen from the high values of the molal voltage stabilisation as measured hereinafter. Furthermore, the compounds have a good solubility in the polyolefin matrix and a low migration tendency, and are compatible with the other components of the polyolefin composition, in particular with cross-linking agents.

If any of said R1, R2, R3, R4, R5, R6, R7 or R8, and, if present, any of said R1' to R8' is a hydrocarbyl group which may contain one or more heteroatoms, is attached to an aromatic ring of the compound according to formula (I), it is preferred that said hydrocarbyl group is free of H atoms in the alpha-position.

Preferably, an amine group may be contained in said hydrocarbyl group of proviso (i) being at least one of said R1, R2, R3, R4, R5, R6, R7, R8, R9 or R10, or if present, at least one of said R1' to R8'. The amine group preferably is a tertiary amine group. A tertiary amine group, in the following abbreviated as tert.-amine group, is an amine group which carries three hydrocarbyl substituents which may contain one or more heteroatoms at the N-atom.

In a preferred embodiment said at least one of said R1, R2, R3, R4, R5, R6, R7, R8, R9 or R10, or, if present, at least one of said R1' to R8' which according to proviso (i) is a hydrocarbyl group which may contain one or more heteroatoms and which contains an amine group selected from the groups of —N(R11)(R12) and —Ar—N(R11)(R12), wherein R11 and R12 independently are hydrocarbyl groups which may contain one or more heteroatoms, and Ar is an aryl group which may contain one or more heteroatoms.

In a further preferred embodiment said at least one of said R1, R2, R3, R4, R5, R6, R7, R8, R9 or R10, or, if present, at least one of said R1' to R8', is a hydrocarbyl group of proviso (i) and is selected from —O(R13) and —Ar—O(R13), wherein R13 is H or a hydrocarbyl group which may contain one or more heteroatoms, and Ar is an aryl group which may contain one or more heteroatoms.

Preferably, in the compounds with the structural units according to formula (I) all atoms in the phenyl or naphthyl rings to which a residue R1 to R10 is attached are carbon atoms.

Furthermore, preferably, R11, R12 and R13, independently are an aryl or alkyl group, more preferably an alkyl group, and still more preferably are a straight alkyl group, which may or may not contain a functional group at the end thereof opposite to the respective ring atom to which the residue is attached. The group, if present, preferably is a —CH=CH$_2$, a halogen, a hydroxyl, carboxylic acid or acid halide group.

R11, R12 and R13, independently preferably contain at least 1 or 2 carbon atoms, more preferably at least 4 carbon atoms, still more preferably contain at least 5 carbon atoms, and most preferably at least 6 carbon atoms.

Examples for such a preferred embodiment of the benzil derivative (B) including —O(R13) are represented by 4-methoxybenzil and 4-hydroxybenzil.

Furthermore, preferably, R11, R12 and R13 independently contain at most 50 carbon atoms, more preferably at most 30 carbon atoms, still more preferably at most 20 carbon atoms, and most preferably at most 16 carbon atoms.

Ar preferably is a substituted or unsubstituted, preferably unsubstituted, phenyl group.

The number n in formula (I) preferably is 2 to 6, more preferably is 2 or 3, and even more preferably is 2.

Furthermore, preferably the compounds comprising, or consisting of, a structural unit according to formula (I) are free of halogen substituents or substituents containing halogen atoms.

It is furthermore preferred that in the structural units according to formula (I) one or two, of R1 to R10, or, if present, R1' to R8' is or are hydrocarbyl groups comprising an amine group in any of the embodiments described before, and the remainder of R1 to R10, or, if present, R1' to R8', are H.

In such cases where two or more of R1 to R10, or, if present, R1' to R8', are hydrocarbyl groups as described, it is preferred that these hydrocarbyl groups are separated by at least one further ring atom, e.g. are located at different phenyl groups or are in meta-position to each other if the two groups are linked to the same phenyl group in the structure of formula (I).

In a further preferred embodiment, the benzil derivative (B) comprises, or consists of, a structural unit in which in formula (I) R3 and R8 independently are a —N(R11)(R12) group, R1, R2, R4, R5, R6, R7, R9 and R10 are H, wherein R11 and R12 have the meaning as defined in any of the embodiments above.

An example for such a preferred embodiment of the benzil derivative (B) is 4,4'-bis(dioctylamino)benzil.

In a further preferred embodiment, the benzil derivative (B) comprises, or consists of, a structural unit in which in formula (I) one of R3 and R8 is an —N(R11)(R12) group, R1, R2, R4, R5, R6, R7, R8, R9 and R10 are H, wherein R11 and R12 have the meaning as defined in any of the embodiments above.

An example for such a preferred embodiment of the benzil derivative (B) is 4-dioctylaminobenzil.

In a further preferred embodiment, the benzil derivative (B) comprises, or consists of, a structural unit in which in formula (I) R3 and R8 independently are a —O(R13) group, R1, R2, R4, R5, R6, R7, R9 and R10 are H, wherein R13 has the meaning as defined in any of the embodiments above.

Examples for such a preferred embodiment of the benzil derivative (B) are p-anisil, 4,4'-dihydroxybenzil, 4,4'-didodecyloxybenzil, and 4,4'-diundec-10-enyloxybenzil.

In a further preferred embodiment, the benzil derivative (B) comprises, or consists of, a structural unit in which in formula (I) one of R3 and R8 is a —O(R13) group, R1, R2, R4, R5, R6, R7, R8, R9 and R10 are H, wherein R13 has the meaning as defined in any of the embodiments above.

Examples for such a preferred embodiment of the benzil derivative (B) are 4-hydroxybenzil, 4-dodecyloxybenzil, and 4-undec-10-enyloxybenzil.

It is preferred in all of the above embodiments that the benzil derivative (B) consists of the structural unit described for the particular embodiment. However, for all cases where the aromatic system(s) of formula (I) contain at least two substituents, it is also possible that structural units of any of the above described embodiments are made into oligomeric structures, to increase the molecular weight.

It is furthermore possible and also within the scope of the invention to attach the compound (B) to one or more further components of the polyolefin composition of the invention, e.g. to attach it to polyolefin (A).

This may be done by copolymerising voltage stabiliser-containing comonomers and "regular" monomers of e.g. polyolefin (A), or by grafting of suitable voltage stabiliser compounds onto a polymer backbone.

Preferably, compound (B) is present in the composition in an amount of 0.001 to 10 wt %, more preferably 0.01 to 5 wt. %, still more preferably from 0.05 to 4 wt. %, still more preferably 0.1 to 3 wt. %, and most preferably from 0.1 to 2 wt. %. Further preferred ranges for compound (B) present in the composition are 0.05 to 3 wt. %, 0.05 to 2 wt. % or 0.05 to 1.5 wt. %.

Polyolefin (A) may be any polyolefin material suitable to be used for the production of a layer of cable, preferably power cable layer, more preferably an insulation layer of a power cable.

Polyolefin (A) preferably comprises, or consists of, a polyethylene or polypropylene. Where herein it is referred to a "polymer", e.g. polyethylene, this is intended to mean both a homo- and copolymer, e.g. an ethylene homo- and copolymer.

Where polyolefin (A) comprises, or consists of, a polyethylene, the polymer may be produced in a high pressure process or in a low pressure process in the presence of a catalyst, for example a chromium, Ziegler-Natta or single-site catalyst, resulting in either unimodal or multimodal polyethylene.

Where polyolefin (A) comprises, or consists of, a polypropylene, this may be a unimodal or multimodal propylene homo- or copolymer and/or a heterophasic polypropylene.

Furthermore, where polyolefin (A) comprises, or consists of, a polypropylene, it is preferred that it has an $MFR_2$ (230° C., 2.16 kg) of from 0.001 to 25 g/10 min.

In a preferred embodiment, polyolefin (A) comprises or consists of an ethylene homo- or copolymer. In the case of an ethylene copolymer, it is preferred that it includes 0.001 to 50 wt.-%, more preferably 0.1 to 40 wt.-%, still more preferably less than 35 wt.-%, still more preferably less than 30 wt.-%, more preferably less than 25 wt-% of one or more comonomers.

Preferably, the density of the ethylene homo or- copolymer is higher than 0.860 g/cm$^3$.

Furthermore, preferably the density of the ethylene homo or- copolymer is not higher than 0.960 g/cm$^3$.

The $MFR_2$ (2.16 kg, 190° C.) of the ethylene homo or- copolymer preferably is from 0.01 to 50 g/10 min, more preferably is from 0.1 to 20 g/10 min, still more preferably is from 0.2 to 15 g/10 min, and most preferably is from 0.2 to 10 g/10 min.

Still further, it is preferred that polyolefin (A) comprises or consists of a polyethylene which has been produced by a high pressure process using free radical polymerization resulting in preferably a low density polyethylene (LDPE). The polymerization generally is performed at pressures of 120 to 350 MPa and at temperatures of 150 to 350° C.

The LDPE may be an ethylene homopolymer or a copolymer of ethylene.

As a comonomer in the ethylene copolymer, a non-polar alpha-olefin may be used, either alone or in addition with further types comonomers. Such alpha-olefins may also comprise further unsaturation present e.g. in polyunsaturated comonomers such as dienes.

Preferred non polar alpha olefins are $C_3$-$C_{20}$ alpha olefins, preferably $C_3$ to $C_{10}$ alpha-olefins are used as comonomers, such as propylene, 1-butene, 1-hexene, 4-methyl-1-pentene, styrene, 1-octene, 1-nonene, polyusaturated comonomers preferably $C_8$ to $C_{14}$ non-conjugated dienes, such as a $C_8$ to $C_{14}$ non-conjugated diene, e.g. 1,7-octadiene, 1,9-decadiene, 1,11-dodecadiene, 1,13-tetradecadiene, or any mixture thereof. Further examples of polyunsaturated comonomers are dienes like 7-methyl-1,6-octadiene, 9-methyl-1,8-decadiene, or mixtures thereof can be mentioned.

It is also possible to use polar comonomers, optionally in combination with the non polar alpha olefin comonomer(s). Preferably, as polar monomer units, compounds containing hydroxyl groups, alkoxy groups, carbonyl groups, carboxyl groups, ether, and ester groups are used.

Still more preferably, the polar monomer units are selected from the group of alkyl acrylates, alkyl methacrylates, and vinyl acetates or mixtures therefrom. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

If polar comonomer units are present in polyolefin (A) it is preferred that the amount is as defined above and below.

If the LDPE is a copolymer, it is preferred that it includes 0.001 to 50 wt.-%, more preferably 0.1 to 40 wt.-%, still more preferably less than 35 wt.-%, still more preferably less than 30 wt.-%, more preferably less than 25 wt.-%, of one or more comonomers.

Polyolefin (A) preferably is cross-linkable. Cross-linking may be achieved e.g. by further including a cross-linking agent into the composition or by the incorporation of cross-linkable groups into polyolefin (A).

In a preferred embodiment, the polymer composition according to the present invention further comprises a cross-linking agent.

In the context of the present invention, a cross-linking agent is defined to be any compound capable to generate radicals which can initiate a cross-linking reaction. Preferably, the cross-linking agent contains at least one —O—O— bond or at least one —N=N— bond.

The cross-linking agent, e.g. a peroxide, is preferably added in an amount of less than 10 wt %, more preferably 0.1 to 5.0 wt. %, still more preferably 0.1 to 3.0 wt. %, even more preferably 0.15 to 2.6 wt. %, based on the weight of the cross-linkable polymer composition.

As peroxides as non-limiting examples of cross-linking agents are i.a. di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, bis(tertbutylperoxyisopropyl) benzene, butyl-4,4-bis(tert-butylperoxy)-valerate, 1,1-bis (tert-butylperoxy)-3,3,5-trimethylcyclohexane, tert-butylperoxybenzoate, dibenzoylperoxide, 2,5-di-methyl-2,5-di(benzoylperoxy)hexane, 1,1-di(tert-butylperoxy) cyclohexane, 1,1-di(tert amylperoxy)cyclohexane, or any mixtures thereof.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

It is preferred that cross-linking is effected by including a cross-linking agent, such as a peroxide in any of the above mentioned embodiments, into the composition.

However, cross-linking may also be achieved by hydrolysable silane groups which may be present in polyolefin (A). Thus, polyolefin (A) may also comprise or consist of a cross-linkable polyolefin containing hydrolysable silane groups. Hydrolysable silane groups are typically crosslinked by a condensation catalyst in the presence of water.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

In case polyolefin (A) comprises or consists of an unsaturated polyolefin, i.e. a polyolefin comprising carbon-carbon double bonds, then preferably the polyolefin has a total amount of carbon-carbon double bonds/1000 carbon atoms of 0.1 or more, more preferably of 0.2 or more, still more preferably of 0.3 or more, and most preferably more than 0.37.

The upper limit of the amount of carbon-carbon double bonds present in the polymer is not limited and may preferably be less than 5.0/1000 carbon atoms, preferably less than 3.0/1000 carbon atoms, or more preferably less than 2.5/1000 carbon atoms.

When used in combination with the unsaturated polyolefin, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds within the polyolefin component enables to accomplish improved cross-linking properties.

The total amount of vinyl groups is preferably higher than 0.02/1000 carbon atoms, more preferably higher than 0.05/1000 carbon atoms, still more preferably higher than 0.08/1000 carbon atoms, and most preferably higher than 0.11/1000 carbon atoms.

Preferably, the total amount of vinyl groups is lower than 4.0/1000 carbon atoms.

Preferred unsaturated polyolefin (A) is an unsaturated polyethylene or an unsaturated polypropylene. More preferably, the unsaturated polyolefin is an unsaturated polyethylene and more preferably an unsaturated homo or copolymer or even more preferably an unsaturated LDPE homo or copolymer.

Preferably, the unsaturated polyolefin is prepared by copolymerising at least one olefin monomer with at least one polyunsaturated comonomer.

In a preferred embodiment, the polyunsaturated comonomer consists of a straight carbon chain with at least 8 carbon atoms and at least 4 carbon atoms between the non-conjugated double bonds, of which at least one is terminal.

Siloxanes having the following formula:

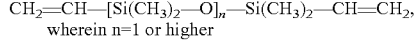

wherein n=1 or higher can also be used as a polyunsaturated comonomer. As an example, divinylsiloxanes, e.g. alpha,omega-divinylsiloxane, can be mentioned.

In addition to the polyunsaturated comonomer, further comonomers can optionally be used, preferably non polar $C_3$-$C_{20}$ alpha olefin comonomers, more preferably $C_3$ to $C_{10}$ alpha-olefin comonomers without further unsaturation, such as propylene, 1-butene, 1-hexene, 4-methyl-1-pentene, styrene, 1-octene, and/or 1-nonene, polar comonomers or any mixture thereof.

It is also possible to use polar comonomers, optionally in combination with the non polar alpha olefin comonomer(s). Preferably, as polar monomer units, compounds containing hydroxyl groups, alkoxy groups, carbonyl groups, carboxyl groups, ether, and ester groups are used.

Still more preferably, the polar monomer units are selected from the group of alkyl acrylates, alkyl methacrylates, and vinyl acetates or mixtures therefrom. Further preferred, the comonomers are selected from $C_1$- to $C_6$-alkyl acrylates, $C_1$- to $C_6$-alkyl methacrylates, and vinyl acetate. Still more preferably, the polar copolymer comprises a copolymer of ethylene with $C_1$- to $C_4$-alkyl, such as methyl, ethyl, propyl or butyl acrylates or vinyl acetate, or any mixture thereof.

If polar comonomer units are present in polyolefin (A) it is preferred that the amount is as defined above.

When preparing the unsaturated polyolefin such as an unsaturated polyethylene in a high pressure process, the polymerisation is generally performed at pressures in the range of 120 to 350 MPa and at temperatures in the range of 150 to 350° C.

The polyolefin can be unimodal or multimodal, e.g. bimodal.

In a preferred embodiment, the polyolefin (A) as polyethylene or the preferably unsaturated polyethylene contains at least 50 wt-% ethylene monomer units.

Polyethylene, or preferably unsaturated polyethylene, of low density is preferred.

In addition to the components polyolefin (A) and aromatic compound (B), the polymer composition may further comprise components, which may, for example, be any type of other polymer.

In one embodiment, the polymer composition of the invention further comprises a polar copolymer (C).

Polar copolymers (C) preferably are olefin copolymers, more preferably propylene or ethylene copolymers containing polar comonomers preferably the ones defined above.

Preferably, the polymer composition further comprises a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing cross-linking performance during the cross-linking step.

Preferred scorch retarders are unsaturated dimers of aromatic alpha-methyl alkenyl monomers, such as 2,4-di-phenyl-4-methyl-1-pentene, substituted or unsubstituted diphenylethylene, quinone derivatives, hydroquinone derivatives, monofunctional vinyl containing esters and ethers, monocyclic hydrocarbons having at least two or more double bonds, or mixtures thereof. More preferably, the scorch retarder is selected from 2,4-diphenyl-4-methyl-1-pentene, substituted or unsubstituted diphenylethylene, or mixtures thereof.

Preferably, the amount of scorch retarder is within the range of 0.005 to 1.0 wt. %, more preferably within the range of 0.01 to 0.8 wt.-%, based on the weight of the cross-linkable polyolefin composition. Further preferred ranges are 0.03 to 0.75 wt %, 0.05 to 0.70 wt-% and 0.05 to 0.50 wt-%, is based on the weight of the cross-linkable polyolefin composition.

The polymer composition may contain further additives, such as antioxidant(s), stabiliser(s), processing aid(s), and/or cross-linking booster(s). As antioxidant, sterically hindered or semi-hindered phenols, aromatic amines, aliphatic sterically hindered amines, organic phosphates, thio compounds, and mixtures thereof, can be mentioned.

Typical cross-linking boosters may include compounds containing at least 1, preferably at least 2, unsaturated groups, e.g. vinyl or an allyl groups, such as an aliphatic or aromatic compound, an ester, an ether, or a ketone, which contains at least 1, preferably at least 2, unsaturated group(s), such as a cyanurate, an isocyanurate, a phosphate, an ortho formate, an aliphatic or aromatic ether, or an allyl ester of benzene tricarboxylic acid. Examples of esters, ethers and ketones are compounds selected from general groups of diacrylates, triacrylates, tetraacrylates, triallylcyanurate, triallylisocyanurate, or any mixtures thereof, e.g. triallylcyanurate, triallylisocyanurate, and di-, tri- or tetra-acrylates.

As further additives, flame retardant additives, acid scavengers, inorganic filler(s), preferably selected from carbon black or flame retardant filler, water-tree retardant(s) and other voltage stabiliser(s) can be mentioned.

If an antioxidant, optionally a mixture of two or more antioxidants, is used, the added amount can range from 0.005 to 2.5 wt. %, based on the weight of the polymer composition.

In general, if a polyethylene is used in the composition, the antioxidant(s) are preferably added in an amount of 0.005 to 1.5 wt. %, more preferably, 0.01-1.2 wt-%, even more preferably 0.04 to 0.80 wt. %, based on the weight of the polymer composition.

Similarly, if a polypropylene is used in the composition, the antioxidant(s) are preferably added in an amount of 0.005 to 2 wt. %, more preferably 0.01 to 1.5 wt-%, even more preferably 0.05 to 1 wt. %, based on the weight of the polymer composition.

Further additive(s) may be present in an amount of 0.001 to 5 wt. %, more preferably 0.005 to 3 wt %, and still more preferably 0.005 to 2 wt. %, based on the weight of the polymer composition. Flame retardant additives and inorganic fillers can be added in higher amounts.

If used for semiconductive layers, the composition may comprise carbon black in usual amounts, preferably in an amount of from 10 to 60 wt. %, more preferably from 20 to 50 wt. %.

The $MFR_2$ (2.16 kg, 190° C.) of the polymer composition preferably is from 0.01 to 50 g/10 min, more preferably is from 0.1 to 20 g/10 min, and most preferably is from 0.2 to 10 g/10 min when no inorganic filler is present.

The polyolefin (A) and the compound (B), optionally in combination with one or more optional additives discussed above, can be blended by any conventional blending technique to result in the polymer composition of the invention.

The polymer composition preferably contains carbon-carbon double bonds in an amount of at least 0.1/1000 carbon atoms, or preferably at least 0.2/1000 carbon atoms or more preferred 0.30/1000 carbon atoms. The upper limit of the amount of carbon-carbon double bonds present in the polymer composition is not limited and may preferably be of less than 5.0/1000 carbon atoms, preferably of less than 3.0/1000 carbon atoms, or more preferably of less than 2.5/1000 carbon atoms.

The total amount of double bonds of the cross-linkable polymer composition is based on vinyl, vinylidene and trans-vinylene groups/1000 carbon atoms of component (A) and/or any further components in the polymer composition comprising such groups.

C—C double bonds present in the polymer composition include vinyl groups and the total amount of said vinyl groups is, in the given preference order, of at least 0.02/1000 carbon atoms, at least 0.05/1000 carbon atoms, at least 0.08/1000 carbon atoms, at least 0.10/1000 carbon atoms, or of at least 0.11/1000 carbon atoms.

The upper limit of the total amount of the vinyl groups present in the polymer composition is typically, in the given preference order, of up to 4.0/1000 carbon atoms, of up to 3.0/1000 carbon atoms, up to 2.5/1000 carbon atoms, or of up to 2.0/1000 carbon atoms.

Accordingly, the total amount the vinyl groups, if present, contributes to the total amount of C—C double bonds present in the polymer composition. The total amount of vinyl groups can e.g. consist of any the above mentioned vinyl groups from the polymer and, if present, added other additives such as boosters, scorch retarders or other further additive(s).

From the polymer composition described above, a cross-linked composition can be prepared by blending with a cross-linking agent, followed by treatment under cross-linking conditions, thereby increasing the cross-linking level. Cross-linking can be effected by treatment at increased temperature, e.g. at a temperature of at least in the range of 150-160° C. When peroxides are used, cross-linking is generally initiated by increasing the temperature to the decomposition temperature of the corresponding peroxide. When the peroxide decomposes, radicals are generated from the peroxide. These radicals then initiate the cross-linking reaction.

The total amount of additive(s) in the polyolefin composition according to the invention is generally 0.05 to 15 wt. %, preferably 0.1 to 12 wt. %, more preferably 0.1 to 10 wt. %.

From the polymer composition of the present invention, a multilayered is article can be prepared wherein at least one layer comprises said polymer composition. When cross-linking is initiated, a cross-linked multilayered article is obtained. Preferably, the multilayered article (either cross-linked or not) is a cable, preferably a power cable.

In the context of the present invention, a power cable is defined to be a cable transferring energy operating at any voltage. The voltage applied to the power cable can be alternating (AC), direct (DC), or transient (impulse).

In a preferred embodiment, the multilayered article is a power cable operating at voltages higher than 1 kV. In other preferred embodiments, the power cable prepared according to the present invention is operating at 6 kV or higher.

The power cable can be prepared in a process wherein the composition of the present invention, optionally in combination with a cross-linking agent, is applied onto a substrate by extrusion. In such an extrusion process, the sequence of mixing the components of the composition can be varied, as explained below.

According to a preferred embodiment, the polyolefin (A), optionally in combination with other polymer component(s), and the compound (B) are mixed with each other and possibly with further additive(s), either on solid pellets or powder of the different polymer components or by melt mixing, followed by forming pellets from the melt.

Subsequently, if used, the cross-linking agent, preferably a peroxide, and optionally a scorch retarder and/or a cross-linking booster are added to the pellets or powder in a second step. Alternatively, the scorch retarder and/or cross-linking booster could already be added in the first step, together with the additives. The final pellets are fed to the extruder, e.g. a cable extruder.

According to another preferred embodiment, instead of a two-step process, the polyolefin (A) and any further polymeric component(s) of the composition, preferably in the form of pellets or powder, compound (B) and, optionally, the further additives, cross-linking agent, and/or scorch retarder, are added to a compounding extruder, single or twin screw. Preferably, the compounding extruder is operated under careful temperature control.

According to another preferred embodiment, a mix of component (B) with all other additives, i.e. including antioxidant (s) and cross-linking agent and optionally a scorch retarder and/or further additives such as a cross-linking booster, are added onto the pellets or powder made of the polyolefin (A) and optionally other polymer component(s).

According to another preferred embodiment, pellets made of the polyolefin (A) and compound (B), optionally further containing further polymeric components and additional further additive(s), are prepared in a first step, e.g. by melt mixing. These pellets, obtained from the melt mixing, are then fed into the cable extruder. Optionally, subsequently, cross-linking agent and optionally a scorch retarder and/or a cross-linking booster are either fed prior to the hopper, in the hopper or directly into the cable extruder and optionally together with further polymeric components if they have not been added in the first step. Alternatively, cross-linking agent and/or scorch retarder and/or cross-linking booster are already added to the pellets before feeding these pellets into the cable extruder or only the crosslinking agent is added prior to the hopper, in the hopper or directly in the cable extruder if all other components already have been added in earlier step(s).

According to another preferred embodiment, pellets made of the polyolefin (A) and any further polymeric component(s) without any additional further component(s) are fed to the extruder. Subsequently, component (B) and optionally antioxidant(s), cross-linking agent(s) and optionally a scorch retarder, optionally in combination further additive(s) such as a cross-linking booster, are either fed in the hopper or directly fed into the polymeric melt within the cable extruder. The compound (B) could be added in this step instead, together with the antioxidant(s), cross-linking agent, scorch retarder and the other optional additives used. Alternatively, one or more of these components, i.e. cross-linking agent, scorch retarder, cross-linking booster, antioxidant(s), compound (B) or a mixture of these components is already added to the pellets before feeding these pellets into the cable extruder, e.g. the components not already present in the fed pellets that should be present in the cable needs to be added at any position in the cable extrusion step.

According to another preferred embodiment, the compound (B) can also be provided in a master batch which comprises at least a matrix polymer and the compound (B). Compound (B) could also be present in the pellets and antioxidant (s), crosslinking agent etc could be added in one or more masterbatches.

The master batch is then added to or mixed with the polyolefin (A) and possibly further polymer components and further processed in a known manner to produce an article, such as power cable.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

Compounding may be performed by any known compounding process, including extruding the final product with a screw extruder or a kneader.

The present invention furthermore relates to a wire or cable, comprising the polyolefin composition in any of the above described embodiments.

In a preferred embodiment, the invention relates to a medium, high or extra high voltage cable comprising one or more conductors in a cable core, an inner semiconducting layer, followed by an insulating layer, and then an outer semiconducting layer, wherein at least one of these layers, preferably the insulating layer, comprises the polyolefin composition as described above.

The term "conductor" means herein above and below that the conductor comprises one or more wires. Moreover, the cable may comprise one or more such conductors. Preferably the conductor is an electrical conductor.

One or more of those layers may also be cross-linked.

In addition to the semiconductive and insulating layers, further layers may be present in medium, high or extra high voltage cables, such as a metallic tape or wire shield, screen(s) and, finally, outermost jacketing layer(s).

The invention relates furthermore to the use of the polyolefin composition in any of the above described embodiments for the production of a layer of a wire or cable, preferably of a layer, more preferably an insulating layer, of a medium, high or extra high voltage cable.

The polyolefin composition according to the present invention comprising the above voltage stabiliser compound is improved especially in electrical breakdown strength and thus achieving an excellent molal voltage stabilisation, measured in the electrical tree testing method described below. This behaviour renders the polyolefin compositions of the present invention highly suitable for the use as a medium/high/extra high voltage cable isolation.

Preferred embodiments of this polyolefin composition are those comprising the above described components (A), polyolefin (A) and (B) in any of their above-described embodiments and amounts.

Finally, the invention relates to the use of a benzil derivative (B) as a voltage stabiliser in a polyolefin composition, said benzil derivative (B) comprising the, preferably consisting of the, structural unit according to the following formula (I):

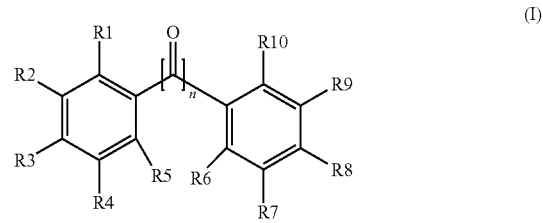

wherein one or more of the carbon atoms in the phenyl rings to which residue R1, R2, R3, R4, R5, R6, R7, R8, R9 or R10 is attached may also be a heteroatom, such as N, in which case the respective residue R1, R2, R3, R4, R5, R6, R7, R8, R9 or R10 is not present;

R1, R2, R3, R4, R5, R6, R7, R8, R9 and R10 independently are hydrogen, or a hydrocarbyl group which may contain heteroatoms;

or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring may further bear one to eight substituents, R1' to R8', each of which are independently selected from said same groups as R1 to R10; and n=2 to 9;

with the proviso that (i) at least one of said R1, R2, R3, R4, R5, R6, R7, R8, R9 or R10, or if present, at least one of said R1' to R8', is a hydrocarbyl group which may contain heteroatoms.

The following examples serve to further illustrate the present invention.

EXAMPLES

1. Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$). The MFR is determined at 230° C. for polypropylenes.

b) Determination of the Amount of Double Bonds

The procedure for the determination of the amount of double bonds/1000 Carbon atoms is based upon the ASTM D3124-72 method. In that method, a detailed description for the determination of vinylidene groups/1000 Carbon atoms is given based on 2,3-dimethyl-1,3-butadiene. The described sample preparation procedure has also been applied for the determination of vinyl groups/1000 Carbon atoms, vinylidene groups/1000 Carbon atoms and trans-vinylene groups/1000 Carbon atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR is spectrometry and given as the amount of vinyl bonds/1000 carbon atoms, vinylidene bonds/1000 carbon atoms and trans-vinylene bonds/1000 carbon atoms, respectively.

Thin films were pressed with a thickness of 0.5-1.0 mm. The actual thickness was measured. FT-IR analysis was performed on a Perkin Elmer 2000. Four scans were recorded with a resolution of 4 $cm^{-1}$.

A base line was drawn from 980 $cm^{-1}$ to around 840 $cm^{-1}$. The peak heights were determined at around 888 $cm^{-1}$ for vinylidene, around 910 $cm^{-1}$ for vinyl and around 965 $cm^{-1}$ for trans-vinylene. The amount of double bonds/1000 carbon atoms was calculated using the following formulas:

$$\text{vinylidene}/1000 \text{ Carbon atoms} = (14 \times A)/(18.24 \times L \times D)$$

$$\text{vinyl}/1000 \text{ Carbon atoms} = (14 \times A)/(13.13 \times L \times D)$$

$$\text{trans-vinylene}/1000 \text{ Carbon atoms} = (14 \times A)/(15.14 \times L \times D)$$

wherein

A: absorbance (peak height)

L: film thickness in mm

D: density of the material (g/cm³)

c) Determination of the Vinyl Content Originating from the Polyunsaturated Compound The amount of vinyl groups originating from the polyunsaturated comonomer per 1000 carbon atoms was determined and calculated as follows:

The polymer to be analysed and a reference polymer have been produced on the same reactor, basically using the same conditions, i.e. similar peak temperatures, pressure and production rate, but with the only difference that the polyunsaturated comonomer is added to polymer to be analysed and not added to reference polymer. The total amount of vinyl groups of is each polymer was determined by FT-IR measurements, as described above. Then, it is assumed that the base level of vinyl groups, i.e. the ones formed by the process and from chain transfer agents resulting in vinyl groups (if present), is the same for the reference polymer and the polymer to be analysed with the only exception that in the polymer to be analysed also a polyunsaturated comonomer is added to the reactor. This base level is then subtracted from the measured amount of vinyl groups in the polymer to be analysed, thereby resulting in the amount of vinyl groups/1000 carbon atoms, which result from the polyunsaturated comonomer.

d) Density

Density of the polymer was measured according to ISO 1183/D.

2. Compositions Produced and Tested a) Production of Voltage Stabilisers

Unless otherwise specified all the reagents are commercially available or can be produced according to methods well known in the literature.

Example 1 p-Anisil

Synthesis of p-Anisil

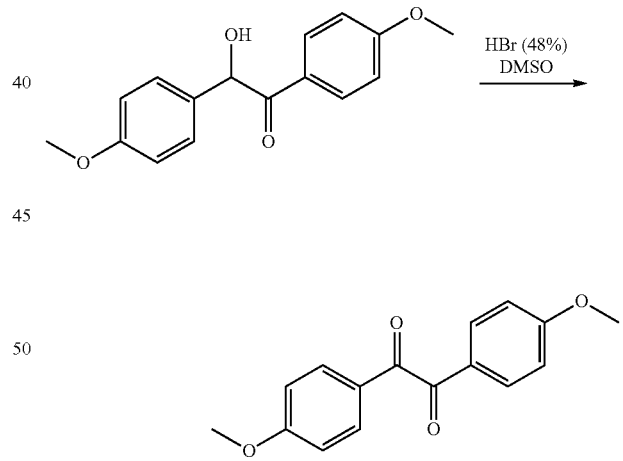

25.3 g of p-anisoin, used as received from Sigma Aldrich, was dissolved in 184 ml dimethylsulphoxide and the mixture was stirred vigorously for 15 min at room temperature. 50 ml 48% hydrobromic acid was added dropwise over 8 min. The solution was heated to 50° C. and after four hours, the temperature was raised to 90° C. and left overnight. Yellow solid was formed upon addition of HBr and more formed during the night. The product was recrystallized and washed in ethanol. 22.7 g of yellow needle crystals (90.3% molar yield) was obtained. The purity was 99.6%, given by gas chromatography.

|  | m (g) | M (g/mol) | n (mol) | V (ml) |
|---|---|---|---|---|
| p-Anisoin | 25.30 | 272.30 | 0.093 | |
| Dimethylsulphoxide (DMSO) | | | | 184 |
| HBr (48%) | | 80.91 | 0.30 | 50 |
| p-Anisil | 22.7 | 270.28 | 0.084 | |

Example 2

4,4'-dihydroxybenzil

Synthesis of 4,4'-dihydroxybenzil

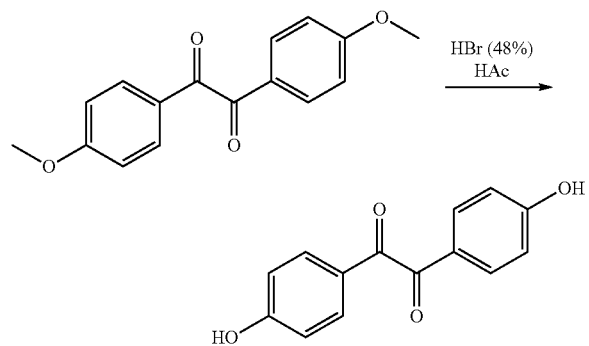

12 g of anisil was dissolved in 120 ml of acetic acid and 240 ml of 48% hydrobromic acid. The mixture was stirred vigorously and heated to reflux to for 4 hours. The temperature was then lowered to 90° C. and left overnight. The resulting solution was poured over ice and the precipitate was collected by filtration and washed with water. After drying, 10.43 g of product (yield: 75.0 mol %) with a purity of 76.8% was obtained. The purity was measured by gas chromatography.

|  | m (g) | M (g/mol) | n (mol) | V (ml) |
|---|---|---|---|---|
| p-Anisil | 12 | 270.28 | 0.044 | |
| HBr (48%) | | 80.91 | 1.42 | 240 |
| acetic acid (HAc) | | 60.05 | 2.10 | 120 |
| 4,4'-Dihydroxybenzil (76.8%) | 10.43 | 242.23 | 0.033 | |

Example 3

4,4'-di(dodecyloxy)benzil

Synthesis of 4,4'-didocecyloxybenzil

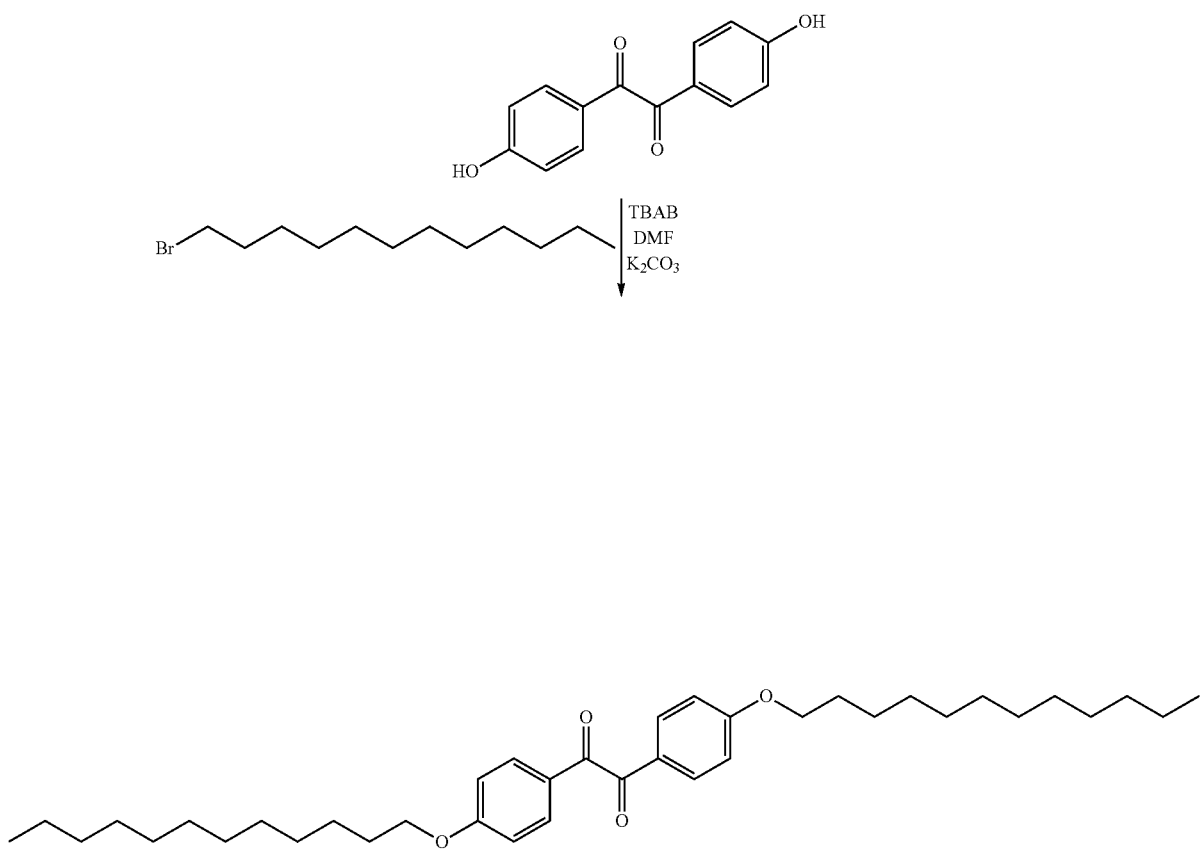

3 g of 4,4'-dihydroxybenzil (76.8%) was mixed with 6.78 g of n-bromododecane, used as received from Sigma Aldrich, 2 g of tetra-n-butylammonium bromide and 3.98 g of potassium carbonate. 90 ml of dimethylformamide was added and the mixture was stirred in a round bottomed flask at 90° C. overnight. A color change from yellow/orange to red and then back to yellow was observed. 100 ml water was added and the product was then extracted first with ether and then reextracted with ethyl acetate and washed three times with water. The remaining solution was dried with $MgSO_4$, filtrated and evaporated in a rotary evaporator. A silica column was run with 50/50(v/v) dichloromethane/n-hexane and the product was isolated together with the remaining bromoalkanes. The product was recrystallized in ethanol, filtered and dried to give 5.12 g of 4,4'-didocecyloxybenzil (yield: 93 mol %).

|  | m (g) | M (g/mol) | n (mol) | V (ml) |
|---|---|---|---|---|
| 4,4'-dihydroxybenzil (76.8%) | 3 | 242.23 | 0.00951 |  |
| tetra-n-butylammonium bromide (TBAB) | 2 | 322.37 | 0.0062 |  |
| Dimethylformamide (DMF) |  | 73.09 | 1.16 | 90 |
| $K_2CO_3$ | 3.98 | 138.21 | 0.0288 |  |
| n-bromododecane | 6.78 | 249.23 | 0.0272 |  |
| 4,4'-didocecyloxybenzil | 5.12 | 578.86 | 0.00884 |  |

$^1$H NMR[Chloroform-D,δ]: 0.87 (t, 6H), 1.25 (m, 36H), 1.79 (m, 4H), 4.01 (t, 4H), 6.94 (d, 4H), 7.92 (d, 4H)

Example 4

4,4'-di(undec-10-enyloxy)benzil

Synthesis of 4,4'-di-11-undecenyloxybenzil 1.5 g of 4,4'-dihydroxybenzil (76.8%) was mixed with 1.0 g of tetra-n-butylammonium bromide, 2.88 g of potassium carbonate and 3.2 g of 11-bromo-1-undecene, used as received from Sigma Aldrich, in 45 ml of dimethylformamide. The mixture was heated to 120° C. under $N_2$ atmosphere and vigorous stirring and left overnight. 50 ml of 2M HCl was added and the solution was extracted with 50 ml of ether and reextracted two times with 20 ml ether. The ether phases were combined and washed with 2M HCl three times. The resulting substance was purified on a silica column on an eluent of dichloromethane/n-hexane with the ratio 1/10 (v/v). The substance was evaporated and then recrystallized in ethanol. After drying, the total amount of product was 1.82 g (yield: 70.8 mol %).

|  | m (g) | M (g/mol) | n (mol) | V (ml) |
|---|---|---|---|---|
| 4,4'-dihydroxybenzil (76.8%) | 1.5 | 242.23 | 0.0047 |  |
| tetra-n-butylammonium bromide (TBAB) | 1 | 322.37 | 0.0031 |  |
| Dimethylformamide (DMF) |  | 73.09 | 0.581 | 45 |
| $K_2CO_3$ | 2.88 | 138.21 | 0.0208 |  |
| 11-bromo-1-undecene | 3.2 | 233.19 | 0.0137 | 2.976 |
| 4,4'-di-11-undecenyloxybenzil | 1.82 | 546.78 | 0.00333 |  |

$^1$H NMR[Chloroform-D,δ]: 1.29 (m, 24H) 1.79 (m, 4H), 2.02 (m, 4H), 4.01 (t, 4H), 5.00 (m, 4H), 5.8 (m, 2H) 6.94 (d, 4H), 7.93 (d, 4H)

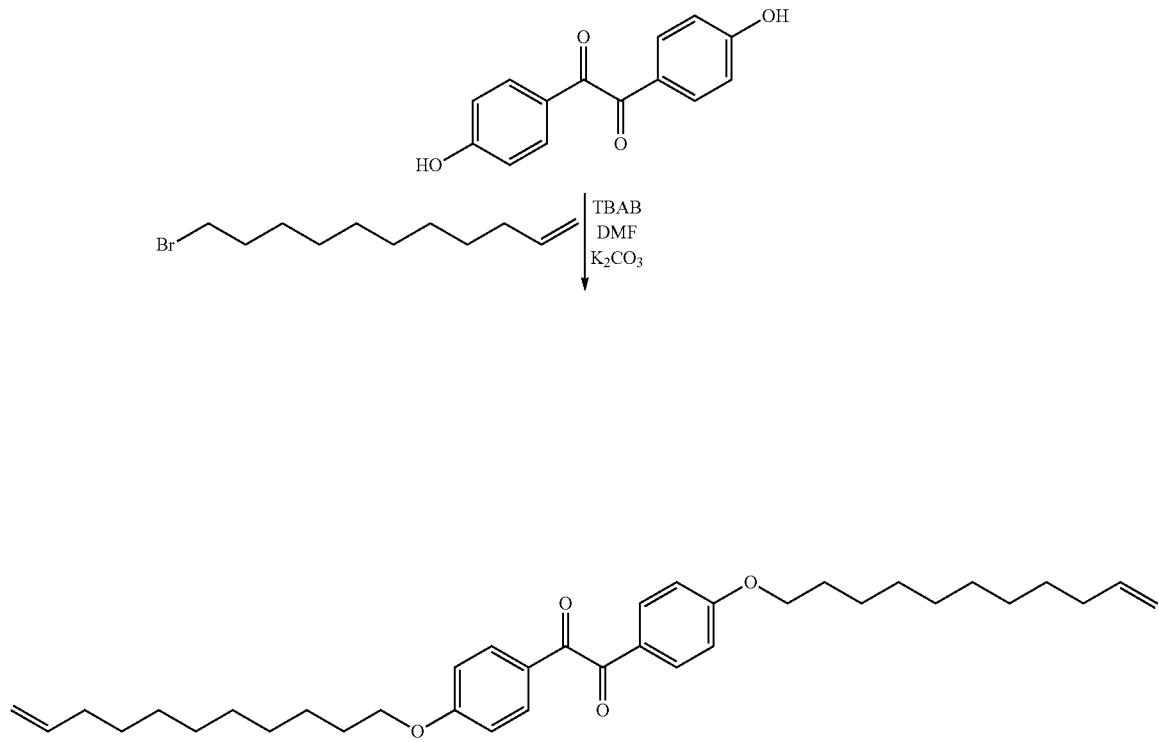

Example 5

N,N,N',N'-tetraoctylbenzil-4,4'-diamine

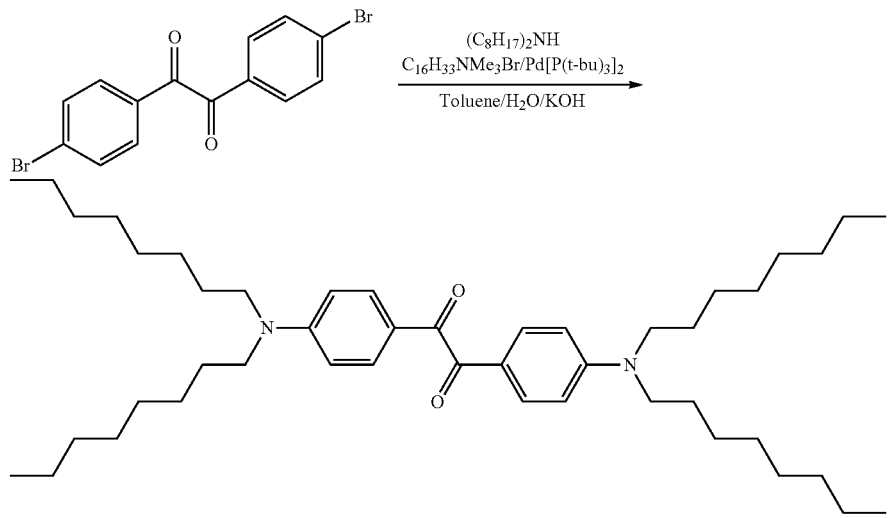

| | m (g) | M (g/mol) | n (mol) | V (ml) |
|---|---|---|---|---|
| 4,4'-dibromobenzil | 2.78 | 368.02 | 0.00755 | |
| Potassium hydroxide (KOH) | 1.35 | 56.108 | 0.024 | |
| cetyl-trimethylammmonium bromide | 0.0456 | 364.46 | 0.000125 | |
| bis(tri-tert-butylphosphine) palladium (0) | 0.101 | 510 | 0.000197 | |
| Toluene | | | | 15 |
| Deionized water | | | | 4.5 |
| Dioctylamine | 7.26 | 241.35 | 0.0301 | 5.8 |
| N,N,N',N'-tetraoctylbenzil-4,4'-diamine (product) | 0.75 | 689.11 | 0.00109 | |

$^1$H NMR[Chloroform-D,δ]: 0.86 (t, 12H), 1.28 (m, 40H), 1.57 (m, 8H), 3.31 (t, 8H), 6.57 (d, 4H), 7.82 (d, 4H)

2.78 g of 4-bromobenzophenone was mixed with 1.35 g of potassium hydroxide, 0.046 g of cetyl-trimethylammonium bromide and 0.10 g of bis(tri-tert-butylphosphine) palladium (0) in a two necked flask, which was then equipped with a condenser and sealed with rubber septa. After three cycles of vacuum/$N_2$ flushing it was left under nitrogen while 15 ml toluene and 4.5 ml of deionized water, both degassed with nitrogen, was added. During stirring, 5.8 ml of dioctylamine was added dropwise after which the solution was heated to reflux for 20 h. The reaction mixture was then quenched with deionized water, extracted with dichloromethane three times, washed with brine (saturated aqueous NaCl solution) two times and dried over magnesium sulfate. The mixture was purified in a silica column using dichloromethane with 5% ethyl acetate as solvent. 0.75 g of pure product was obtained as highly viscous yellow oil. A yield of 14.4 mol % was obtained.

b) Production and Testing of Compositions

Several compositions including voltage stabilisers for the preparation of insulating layers were prepared and tested together with a reference polymer without voltage stabiliser according to the following procedures:

Material and Test Set Up for Electrical Tree Testing

In each test for general definitions and for the examples of this application the test arrangement was the same for the reference polymer, i.e. the polymer without the voltage stabilizing compounds to be tested, and for is the tested compositions, i.e. the reference polymer containing the voltage stabilizing compounds.

A commercially available cross-linkable low density polyethylene (LDPE) with a grade name, Supercure™ LS4201S, supplied by Borealis, Sweden, which was prepared by high pressure polymerization and had a density of 0.922 g/cm$^3$ (ISO1872-2/ISO1183-2), MFR$_2$ (ISO 1133, load 2.16 kg, at 190° C.) of 2 g/10 min was used as the polymer for preparing the compositions and the reference polymer to be tested.

The reference polymer was in a form of pellets which contained dicumyl peroxide as a cross-linking agent.

Sample Preparation for Electrical Tree Testing

Impregnation

The reference polymer pellets for electrical tree testing was ground to a fine powder in a Retsch grinder with a 500 micrometer sieve. For the preparation of the compositions according to the invention and the preparation of the comparative compositions, the obtained powder was impregnated with the respective test voltage stabiliser dissolved in appropriate organic solvent for one hour while agitated every 15 minutes. The solvent was then removed by means of rotary evaporation and to vacuum oven to obtain a dry powder with a homogeneously distributed voltage stabiliser.

The following compounds were used in the tested compositions as voltage stabilisers:

Example 3

4,4'-di(dodecyloxy)benzil

Example 4

4,4'-di(undec-10-enyloxy)benzil

Example 5

N,N,N',N'-tetraoctylbenzil-4,4'-diamine

Preparation of Test Objects

The impregnated powder is then moulded into plaques with a thickness of 6 mm according to the below stated molding and cross-linking procedure. The molding and cross-linking cycle of the plaques starts at 2 kN for 3 minutes and ranges from 2 kN to 200 kN over 18 minutes with a load increase rate of 11 kN/min and is withheld at 200 kN for the rest of the duration of the molding and cross-linking cycle. During the molding cycle the temperature is set at 130° C. at the beginning of the cycle and is set at this temperature for the first six minutes after which it increases to 180° C. during 15 minutes with a temperature increase rate of 3.3° C./min and is maintained at 180° C. for 15 minutes for completing the cross-linking of the plaques before descending to room temperature over a period of approximately 30 minutes. The pressed plaques are degassed at 1 atm at 90° C. during 4 days. The samples are then cut to a size of 25.5 mm×21 mm×6 mm (+/−0.5 mm). To generate the electrical field needed for electrical treeing one sharp, tip radius 3 μm and one dull needle, tip radius 5 mm, are used. Before use the needles are examined and washed with isopropanol. The needles are then inserted into the plaque from opposite sides on each of the 21 mm×6 mm surfaces with the help of a fixture to ensure the centricity of the needles, as detailed in "ASTM D3756-97 (2004) "Standard Test Method for Evaluation of Resistance to Electrical Breakdown by Treeing in Solid Dielectric Materials Using Diverging Fields," E. Series, Ed., ed: ASTM International, 2004. The sharp needle has a radius of 3 μm and the dull needle has a radius of 0.5 mm. Before the insertion of the needles into the plaques the fixture with plaques are placed in an oven at 120° C. for 90 minutes after which the needles are inserted slowly until they are 3.5 mm apart. The samples are left in the oven at 120° C. for another 30 minutes before the oven is turned off and the samples are left to reach room temperature inside the oven during 10 h. The samples are then stored under constant conditions 23° C. and 50% RH until they are put in the test cell. The electrical tree testing is also done at 23° C. and 50% RH.

c) Results

1. Electrical Treeing Evaluation

The electrical field at which the insulation material starts to exhibit electrical treeing, also called electrical tree inception, is evaluated with a conventional double needle approach. The needle configuration is explained in detail in A. C. Ashcraft, et al., "Labarotory Studies of Treeing in Solid Dielectrics and Voltage Stabilization of Polyethylene," Montreal, Canada, 1978, pp. 213-218 and in ASTM D3756-97 (2004) "Standard Test Method for Evaluation of Resistance to Electrical Breakdown by Treeing in Solid Dielectric Materials Using Diverging Fields," E. Series, Ed., ed: ASTM International, 2004. Instead of applying constant AC voltage the voltage is increased with a rate of 10V/min, starting at 8 kV and with a highest level of 22 kV. The electrode system is connected to a partial discharge detector which will shut off the high voltage upon detecting discharges. The samples are then cut into thin slices and examined under microscope to establish whether an electrical tree is responsible for generating the partial discharges at which the equipment has shut off. If a tree is located the sample is counted as a breakdown, if no tree is seen the sample is counted as a flash over and will be suspended/censored in the statistic evaluation.

2. Analysis of Results

The tree initiation voltage for the material was determined by applying 2 parameter Weibull statistics according to the IEC standard "Guide for the Statistical Analysis of Electrical Insulation Breakdown Data, Vol. IEC 62539:2007(E), ed. Geneva: The International Electrotechnical Commission (IEC), 2007" to the breakdowns recorded. From the Weibull statistics a scale parameter was obtained from the commercial software WinSmith Weibull 4.0 by Fulton Findings and this was reported as the electrical tree inception voltage.

For comparison of the efficiency of the different additives, the efficiency factor MVS (Molal Voltage Stabilisation) which is based on a molal basis was used (A. C. Ashcraft, et al., "Labarotory Studies of Treeing in Solid Dielectrics and Voltage Stabilization of Polyethylene," Montreal, Canada, 1978, pp. 213-218). The MVS is defined as the difference between the reference material with and without stabiliser divided by the molal amount of stabiliser added.

$$MVS = \frac{Stabilized_{Tree\ Inception} - Ref_{Tree\ Inception}}{Mole\ Stabilizer/kg\ Polymer}$$

Results

|  | n | susp | α | β | TIV [kV] | ΔkV | MVS [kVkg/mol] |
|---|---|---|---|---|---|---|---|
| Reference | 20 | 3 | 12.9 | 5.1 | 12.9 | — | — |
| Example 3 | 10 | 5 | 21.7 | 2.8 | 21.7 | 8.7 | 1442 |
| Example 4 | 10 | 6 | 29.8 | 2.7 | 29.8 | 16.9 | 2639 |
| Example 5 | 10 | 4 | 18.2 | 2.9 | 18.2 | 5.3 | 1036 | n: number of tested samples,
susp number of suspended samples,
α and β scale and shape parameter respectively, obtained from Weibull statistics,
TIV tree inception voltage,
ΔkV difference in voltage between the reference and the example
MVS molal voltage stabilisation.

It can be seen from the above table that the inventive examples 3 to 5 show significantly increased tree inception voltage compared to the reference material.

The invention is claimed:

1. A polyolefin composition comprising
   a. a polyolefin (A),
   b. a benzil derivative voltage stabilizer (B) comprising the structural unit according to the following formula (I):

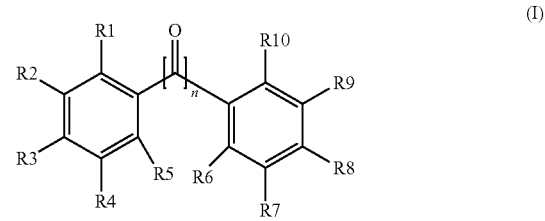

wherein
R1, R2, R3, R4, R5, R6, R7, R8, R9 and R10 independently are hydrogen, or a hydrocarbyl group which optionally contain heteroatoms selected from the group consisting of Si, N, Po, O, and S;
or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring optionally further bear one to eight substituents, R1' to R8', each of which are independently selected from said same groups as R1 to R10; and
n=2 to 9;
with the proviso that
(i) at least one of said R1, R2, R3, R4, R5, R6, R7, R8, R9 or R10, or at least one of said R1' to R8', is selected from the group consisting of —N(R11)(R12) —Ar—N(R11)(R12), —O(R13), and —Ar—O(R13), wherein R11 and R12 are independently hydrocarbyl groups which optionally contain heteroatoms, Ar is an aryl group which optionally contain heteroatoms, and R13 is H or a hydrocarbyl group which optionally contain heteroatoms.

2. The polyolefin composition according to claim 1 wherein said n is 2 to 6.

3. The polyolefin composition according to claim 1, wherein said hydrocarbyl group of proviso (i) contains a heteroatom selected from the group consisting of Si, N, P, O and S.

4. The polyolefin composition according to claim 1 wherein said heteroatom is N and said hydrocarbyl group of proviso (i) contains a tert.-amine group.

5. The polyolefin composition according to claim 1 wherein R11 and R12, independently are an aryl or alkyl group.

6. The polyolefin composition according to claim 1 wherein R13 is an aryl or alkyl group.

7. The polyolefin composition according to claim 1 wherein N(R11)(R12) is in para-position to the carbonyl function in the compound of formula (I).

8. The polyolefin composition according to claim 1 wherein O(R13) is in para-position to the carbonyl function in the compound of formula (I).

9. The polyolefin composition according to claim 7, wherein both R8 and R3 are substituted with said —N(R11)(R12).

10. The polyolefin composition according to claim 8, wherein both R8 and R3 are substituted with said —O(R13).

11. The polyolefin composition according to claim 1 wherein R11 and R12 independently are an alkyl group, which optionally contain a functional group at the end opposite to the respective ring atom.

12. The polyolefin composition according to claim 1 wherein R13 is an alkyl group, which optionally contains a functional group at the end opposite to the respective ring atom.

13. The polyolefin composition according to claim 1 wherein R11 and R12 independently contain from 1 to 50 carbon atoms.

14. The polyolefin composition according to claim 1 wherein R13 contains from 1 to 50 carbon atoms.

15. The polyolefin composition according to claim 1 wherein R11 and R12 independently contain from 6 to 18 carbon atoms.

16. The polyolefin composition according to claim 1 wherein R13 contains from 6 to 18 carbon atoms.

17. The polyolefin composition according to claim 1 wherein R11 and R12 independently contain from 6 to 12 carbon atoms.

18. The polyolefin composition according to claim 1 wherein R13 contains from 6 to 12 carbon atoms.

19. A cable comprising a layer made of the polyolefin composition according to claim 1.

20. A method for the production of a layer of a cable wherein the polyolefin composition according to claim 1 is used.

21. A method for the production of a layer of a cable wherein a polyolefin composition according to claim 1 is used.

22. A method for the production a polyolefin composition utilizing a benzil derivative (B) as a voltage stabiliser, the benzil derivative (B) comprising the structural unit according to the following formula (I):

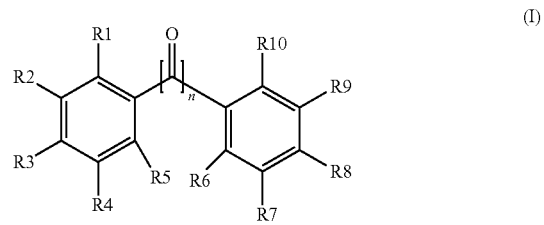

wherein
R1, R2, R3, R4, R5, R6, R7, R8, R9 and R10 independently are hydrogen, or a hydrocarbyl group which optionally contain heteroatoms selected from the group consisting of Si, N, Po, O, and S;
or at least two of said R1, R2, R3, R4, R5, R6, R7, R8, R9 and R10 together with the ring atoms of the ring system of formula (I) they are attached to, form a further aromatic or non-aromatic ring fused to the ring system of formula (I), and wherein the ring system of formula (I) with said at least one fused further ring optionally further bear one to eight substituents, R1' to R8', each of which are independently selected from said same groups as R1 to R10; and
n is 2 to 9;
with the proviso that
(i) at least one of said R1, R2, R3, R4, R5, R6, R7, R8, R9 or R10, or at least one of said R1' to R8', is selected from the group consisting of —N(R11)(R12) —Ar—N(R11)(R12), —O(R13), and —Ar—O(R13), wherein R11 and R12 are independently hydrocarbyl groups which optionally contains heteroatoms, Ar is an aryl group which optionally contains heteroatoms, and R13 is H or a hydrocarbyl group which optionally contain heteroatoms.

23. The polyolefin composition according to claim 1, wherein the benzil derivative voltage stabilizer (B) consists of the structural unit according to formula (I).

24. The method according to claim 22, wherein the benzil derivative voltage stabilizer (B) consists of the structural unit according to formula (I).

25. The polyolefin composition according to claim 1, wherein the heteroatom is N.

26. The method according to claim 22, wherein the heteroatom is N.

* * * * *